(12) United States Patent
Papiernik et al.

(10) Patent No.: US 7,062,353 B2
(45) Date of Patent: Jun. 13, 2006

(54) METHOD AND SYSTEM FOR RECONSTRUCTING A SURFACE

(75) Inventors: Wolfgang Papiernik, Neunkirchen (DE); Christof Sinn, Mühlacker (DE); Leif Kobbelt, Aachan (DE)

(73) Assignee: Siemens Aktiengesellschaft, München (DE)

( * ) Notice: Subject to any disclaimer, the term of this patent is extended or adjusted under 35 U.S.C. 154(b) by 305 days.

(21) Appl. No.: 10/416,746

(22) PCT Filed: Nov. 5, 2001

(86) PCT No.: PCT/DE01/04149

§ 371 (c)(1),
(2), (4) Date: Oct. 16, 2003

(87) PCT Pub. No.: WO02/39080

PCT Pub. Date: May 16, 2002

(65) Prior Publication Data

US 2004/0070585 A1    Apr. 15, 2004

(30) Foreign Application Priority Data

Nov. 13, 2000  (DE) ................................ 100 56 143
Jul. 24, 2001   (DE) ................................ 101 35 992

(51) Int. Cl.
*G06F 19/00*   (2006.01)

(52) U.S. Cl. ...................... 700/189; 700/194; 345/419; 345/421

(58) Field of Classification Search ................ 345/419, 345/421; 700/189, 194
See application file for complete search history.

(56) References Cited

U.S. PATENT DOCUMENTS

| | | | | |
|---|---|---|---|---|
| 5,710,709 A * | 1/1998 | Oliver et al. | ................ | 700/184 |
| 5,796,618 A * | 8/1998 | Maeda et al. | ................ | 700/182 |
| 5,886,702 A | 3/1999 | Migdal et al. | | |
| 6,016,153 A | 1/2000 | Gueziec et al. | | |
| 6,901,310 B1 * | 5/2005 | Kobbelt et al. | ............. | 700/187 |

FOREIGN PATENT DOCUMENTS

| | | |
|---|---|---|
| EP | 0 153 556 A | 9/1985 |
| WO | WO 00/45237 A | 8/2000 |

OTHER PUBLICATIONS

Kobbelt L et al.: "A General Framework fo Mesh Decimation", Proceedings Graphics Interface 98, Vancouver, BC, Jun. 18-20, 1998, Graphics Interface, Toronto: CIPS, CA, vol. Conf., 24, pp. 43-50 XP001064700 ISBN: 0-9695338-7-X p. 47,50, figures 4-9.

Kobbelt L et al.: "Multiresolution Hierarchies on Unstructured Triangle Meshes", Computational Geometry. Theory and Applications, Elsevier Science, Amsterdam, NL, Nov. 30, 1999, vol. 14, No. 1-3 pp. 5-24 XP001033663, abstract.

* cited by examiner

*Primary Examiner*—Leo Picard
*Assistant Examiner*—Michael D. Masinick
(74) *Attorney, Agent, or Firm*—Henry M. Feierisen (57) ABSTRACT

The invention relates to especially simple, rapid and multi-dimensional surface reproduction. According to the inventive method for reconstructing a surface of a structure which is described by 3D data points in chronological order, 3D data points are processed using a linear interpolation in such a way that chronologically directly adjacent 3D data points remain unchanged.

8 Claims, 10 Drawing Sheets

METHOD AND SYSTEM FOR RECONSTRUCTING A SURFACE

BACKGROUND OF THE INVENTION

The invention relates to a method and system for reconstructing a surface with multi-dimensional data points, in particular 3-D data points, and to a computer program product for carrying out the method as well as to a computer programmed with the computer program product.

Such method is applied, for example, to reconstruct or simulate a surface or a structure, e.g., a surface of a workpiece to be machined with a milling machine. For this purpose, the workpiece to be machined is typically modeled by a so-called CAD-System (CAD=computer aided design system). For testing purposes, a contour representing the workpiece is visualized based on milling points or milling paths. However, such visualization, when only applied to the surface, is inadequate and inaccurate when operating on a complex workpiece, in particular a workpiece with undercut contours. The workpiece contour can thereby only be insufficiently ascertained. In particular, three-dimensional surfaces cannot be reconstructed.

SUMMARY OF THE INVENTION

It is therefore an object of the invention to provide a method for reconstructing a surface which enables a multi-dimensional surface reproduction in a simple manner.

The invention is based on the concept that in a method for reconstructing or simulating a surface, in particular the surface of a workpiece, data points are generated which describe the surface. It should therefore be possible to reconstruct the surface without geometrical information based on a relationship between neighboring data points. For this purpose, the structure is preferably described based on a chronological order of existing 3-D data points by describing the 3-D data points by a linear interpolation, wherein chronologically directly adjacent 3-D data points remain unchanged. Advantageously, a two-dimensional (surface) grid is generated as an output, in particular a triangular grid, which places the existing data points on the grid and includes the original edges of polygonal paths as grid edges. This method is preferably referred to as "meshing", since individual data points forming a mesh are spun into a grid. The surface contour can be simulated most accurately with a grid formed in this way, preferably a triangular grid. In particular, this guarantees that a topology on which the body or the structure is based is taken into consideration.

Depending on the configuration and design of the structure or body, in particular when the body is very complex and has a very small step length between adjacent data points, a large number of grids or partial grids are generated. The complexity can be simplified and reduced by advantageously combining data points, which are spaced by less than a predetermined step length, into a single grid data point by considering a predeterminable approximation tolerance. Any resulting triangles, also referred to as degenerated triangles, are identified and removed, which readily reduces the grid complexity. This method is preferably referred to as "rasterizing", since a raster is generated by quantizing the step lengths.

For describing a very complex body, a plurality of grids is advantageously connected with each other based on the grid data points in such a way that edge polygons remain unchanged. The contour of the body, in particular its edge points, then also remain unchanged during the reconstruction or simulation. This method is preferably referred to as "fusion", because connecting of grid data points produces partial surfaces of the body that are connected with each other based on fused grids. "Fusion" makes it possible, for example, to join areas of the reproduced sections of the workpiece. This is required, for example, if non-contour travel paths, e.g., access paths, are present which cause the workpiece and/or the 3-D edges of the workpiece to disintegrate into separately machined parts.

Depending on how the respective reproduction method of the surface is performed and operates, the aforedescribed methods—"meshing", "rasterizing" or "fusion"—can be performed as separate methods and hence independently of each other. This depends specifically on the type of the input data and/or on the degree of the meshing that can be achieved. For a very accurate and realistic reconstruction of the surface, the three methods are performed stepwise, whereby with each method step the available data are completed or removed, as desired.

Preferably, one of the preceding methods is used to reconstruct a contour of the workpiece formed by milling paths. Advantageously, a milling path is defined by 3-D data points, which approximate the surface of a milled workpiece. Preferably, a system for visualizing and/or transforming a data set is provided which includes means for reconstructing a surface of a body. For example, the system can be a CAD system, for example a programmable computer, for modeling the workpiece. The CAD system, in particular its CAD/CAM interface, provides a computer program product, e.g. a so-called NC-program (NC=numerical control).

CAD modeling of the workpiece performed with the CAD system produces NC parts programs, i.e., 3-D data points, which provide milling instructions for the tool center. The milling instructions are typically for meander-shaped and/or circular milling paths. In addition, CAD modeling produces an NC parts program which is then applied to a controller with a different NC control components, e.g., a compressor, interpolator. The visualization is advantageously performed over a surface area so that contour flaws can be more easily determined. For example, when employing an exemplary zero-dimensional milling cutter, for example a point milling cutter, the resulting workpiece contour is a two-dimensional path of the center of the milling cutter. This two-dimensional path already allows inferences about flaws in the workpiece contour to be milled.

The invention solves problems associated with surface reproduction in a particularly simple manner. The milling points, which are located as data points on the two-dimensional grid, are the interpolated based on the determined triangular grid. In addition, the milling path is kept intact except for the edge regions, i.e., no triangles are generated on milling paths that are not located opposite each other. In this way, the surface, and in particular its edges, are nearly faithfully reproduced when a triangular grid is optimized by the interpolation. According to a particularly advantageous feature of the method, no restrictions or limitations are imposed on the workpiece topology. As a result, undercut contours can also be reproduced with this method.

The particular advantages achieved with the invention are that an area can be reproduced while at the same time the edges, such as the edges of a milling path, are preserved. The surfaces of a body can hence be reproduced with faithful contours. In particular, the topology of the body is adequately taken into account, so that for example undercut contours of a milled workpiece can be reproduced.

BRIEF DESCRIPTION OF THE DRAWING

Embodiments of the invention will be described hereinafter with reference to the Figures. It is shown in.

DETAILED DESCRIPTION OF PREFERRED EMBODIMENTS

Corresponding elements in all Figures are provided with identical reference numerals.

The invention will be described with reference to an exemplary algorithm for reconstructing the surface of a workpiece to be machined with a milling machine. The algorithm or the method is also suitable for reconstructing various other surfaces.

For reconstructing the surface of the workpiece to be milled, discrete milling path data are defined as data points, in particular 3-D data points. When the workpiece is subsequently machined, the data points are transferred in chronological order to the milling machine by an NC program. In other words: a sequence of point coordinates or milling path data which represents the target position of a milling head in chronological order, are defined as a data points. A triangular grid is generated as an output by the method, which meshes the given data points and includes as a subset of the grid edges the original edges of the polygonal milling path. No additional input, in particular no additional geometric information, is required aside from the neighborhood association of consecutive milling path points.

The method is advantageously optimized based on surface-geometry heuristics, for example the existence of a tangential plane. The method is preferably subdivided into three mutually independent phases which will be described in more detail below. The details are directed to the basic algorithms. The three phases can be carried out separately or consecutively as a complete process.

Phase 1: "Meshing"

To reconstruct the surface, the actual meshing operation connects the data points or milling path data by meshing the spaces between adjacent milling paths. The result is a triangular grid, wherein the triangles are defined as a triplet of point indices.

Figure 1:
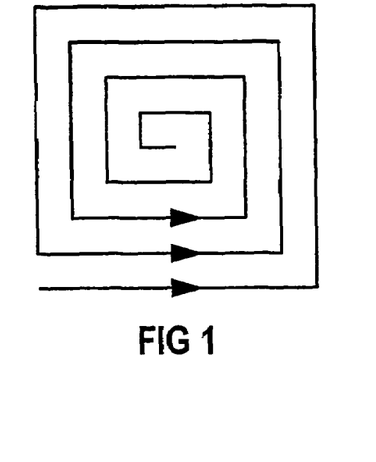
FIGS. 1 to 3 a schematic diagram of different milling path configurations.
Figure 2:
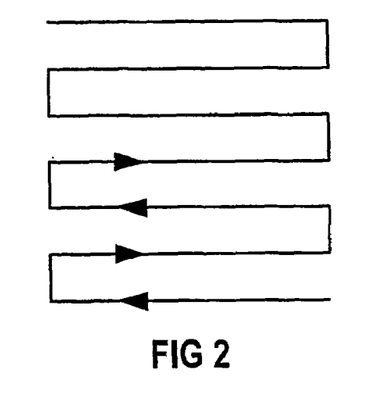
Figure 3:
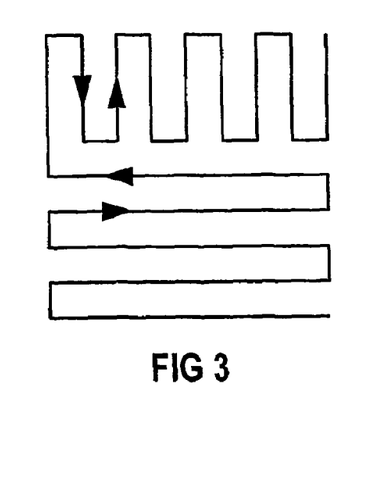

Adjacent milling paths can be categorized either as spiral configurations or as meander configurations. In a spiral configuration, the two milling paths have the same sense of direction, whereas they have the opposite sense of direction in a meander configuration. While other configurations of closely spaced milling paths can occur when the main direction changes during milling, these configurations are not considered adjacent milling paths. Any resulting gaps in the reconstructed surface can be closed in the following phase, for example in the "fusion phase." Different exemplary configurations for adjacent milling paths are shown in FIGS. 1 to 3. Meshing preferably makes certain plausible assumptions about the geometry of milling paths and the surfaces. This includes, in particular, assumptions about the track of adjacent milling paths, for example quasi-parallelism, which simplifies identification. Depending on the assumptions, a simple grid of this type is sufficient for reconstructing the surface.

Phase 2: "Rasterizing"

Alternatively or in addition, the grid produced in the meshing phase can be processed by so-called "rasterizing", which reduces the complexity of the data and facilitates additional processing. In particular, the grids reconstructed in the meshing phase can become very complex when using more complex NC programs or employing a very small step length along the milling path. To simplify and accelerate the subsequent data processing with a computer program product, the complexity of the grid has to be reduced, while retaining the best possible visualization of the surface. For this purpose, the data points, i.e. the milling path points, which are spaced by less than a defined step length $\epsilon$, are combined to a single grid data point. The grid complexity is reduced by removing any resulting degenerate triangles. An approximation error produced by the reduction can be estimated by the size of the raster and then taken into account as approximation tolerance.

Phase 3: "Fusion"

Alternatively or in addition, the grids generated in the meshing and/or rasterizing phase can be processed by so-called "fusion" which further improves the reconstruction of the surface. For example, when processing realistic data, an individual NC program can break up into several parts programs when the milling head is pulled back and then set down again. In addition, gaps caused by a change in the main milling direction can remain in the reconstructed surface following the meshing phase. These partial grids are preferably connected to a full surface in the fusion phase. Since the partial grids represent surfaces reconstructed from milling paths, the number of possible geometric configurations is reduced so that corresponding edge polygons can be uniquely associated.

Figure 4:
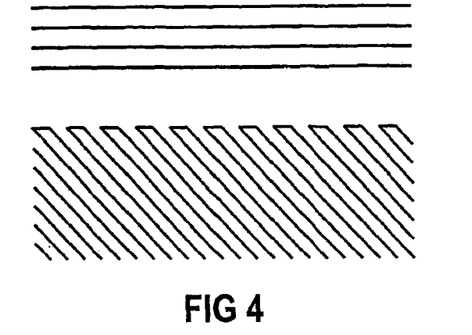
FIGS. 4 to 6 a schematic diagram of a polygonal surface reconstructed with a grid technique, FIGS. 7 to 8 a schematic diagram of directly adjacent paths with penetration points, FIGS. 9 to 10 a schematic diagram of the partially reconstructed surface and a corrected surface, FIG. 11 a schematic diagram of a non-monotonic index sequence of connection points and hence an inconsistent meshing, FIGS. 12 to 13 a schematic diagram of a partially or totally meshed surface, FIGS. 14 to 15 a schematic diagram of a surface with geometric artifacts and a surface with the artifacts removed, FIG. 16 a schematic diagram of a surface with adjacent triangles of a grid, FIGS. 17 to 20 a schematic diagram of meshed surfaces with different approximation tolerances, and FIGS. 21 to 23 a schematic diagram of adjacent partial grids that are meshed with each other.
Figure 5:
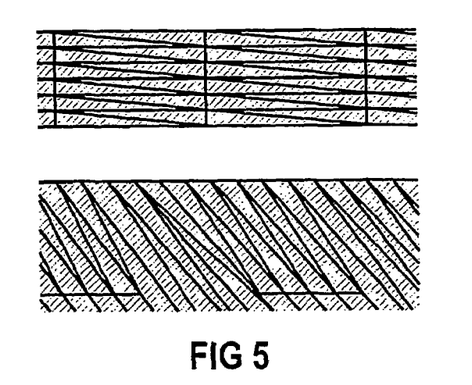
Figure 6:
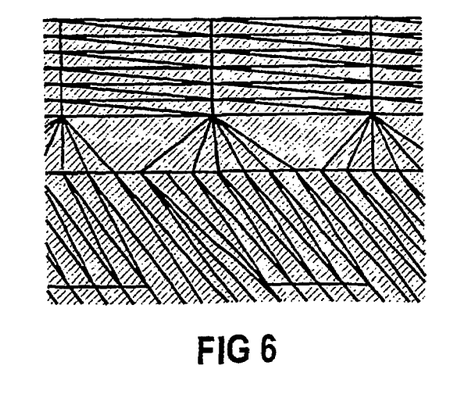

FIG. 4 shows an exemplary reconstruction of a polygonal surface from defined data points which represent milling path data. FIG. 5 shows the actual meshing process of the milling paths through generation of triangular grids based on meshing without fusion of the partial grids. FIG. 6 shows the fusion of several partial grids, whereby grid data representing edge points are retained.

The essential task in the meshing phase according to FIG. 5 is to create an association between each edge of the polygonal milling path and the corresponding data points of the adjacent milling paths. Meshing is complete when at least two triangles are associated with each edge of the polygonal milling path, for example one triangle each for connecting the corresponding left and right neighboring path. This type of meshing ensures that the edges of the original milling path according to FIG. 4 are included in the triangulation. Additional triangles would destroy the surface topology. The algorithm starts here with a search phase, during which additional neighborhood associations are determined and generated based on connections. The initial connections are modified by various heuristic methods in order to improve the surface quality. In this context, heuristics are preferably used since exact statements about the behavior of the surface between the milling paths cannot be made. A topologically consistent grid according to FIG. 5 is generated from the determined connections between the milling path. Subsequent optimizations, for example after rasterizing or fusion, performed on the grid structure increase the geometrical smoothness of the reconstructed surface and close smaller gaps at the turning points of the milling paths, as shown by example in FIG. 6.

A triangular grid is almost completely defined when a complete list of direct neighbors can be determined for each triangle or data point (also referred to as vertex). Since the preset or determined point data or data points Pi represent a polygonal milling path, it is known a priori for each data point Pi that the data point Pi−1 and the data point Pi+1 are neighbors. This is a result of the requirement that the edges of the milling path should form a partial set of the grid edges in the reconstructed triangular grid. For a complete surface reconstruction, the neighborhood information is advantageously reconstructed orthogonal to the milling path tangent. For this purpose, preferably at least two triangles are generated for each edge $\overline{PiPi+1}$. At the periphery of the workpiece, i.e., for the first and last milling path and their turning points, at least one triangle is determined for each milling path edge. A triangle is uniquely determined for an edge $\overline{PiPi+1}$ by a third point Pj located on an adjacent milling path. Only one triangle is determined for each edge by searching the neighborhood in order to optimize the performance of the algorithm and to prevent the generation of topological inconsistencies. The second triangle is advantageously determined in the actual meshing phase by a reverse meshing process.

The edge $\overline{PiPi+1}$ is preferably used as a tangent of the surface to be reconstructed. In addition, a center plane Ei is determined which goes through a point Mi=½ (Pi+Pi+1) and is oriented perpendicular to the aforementioned edge. The set of all penetration points of other milling edges $\overline{PjPj+1}$ through the center plane Ei corresponds to a discrete intersection contour of the surface to be reconstructed. The polygon defined by the center plane Ei represents the orthogonal direction of tangent. The neighborhood associations are generated by determining the closest penetration points and associating these points with the edge $\overline{PjPj+1}$. For each milling path edge, a triangle is determined by a neighborhood search, for example by an "upstream" or "downstream" search. I.e., the points Pj are determined with j<i or j>i+1.

Since each individual milling path consists of a single contiguous component, there necessarily exists a strong coherence between the spatial neighborhood and an index offset |j−i|. The search space for determining the neighborhood can therefore be limited. For example, it is sufficient to search for the closest penetration point only inside a predetermined window Pi+2, . . . , Pi+r. All other penetration points described more distal milling paths and are not considered. The size r of the window depends on the maximum number of points Pi located on the same milling path. For example, a maximum value of s is preset. For a spiral configuration having spiral paths according to FIG. 1, the value r is defined with r>s. In a meander configuration with so-called plough furrows according to FIG. 2, the value of r is defined with r>2s. Additional information can be considered when defining the value of r. In general, decreasing the value of r can significantly shorten the total processing time; conversely, a larger value r makes the method more reliable, in particular with NC programs with an extremely small step length.

Figure 7:
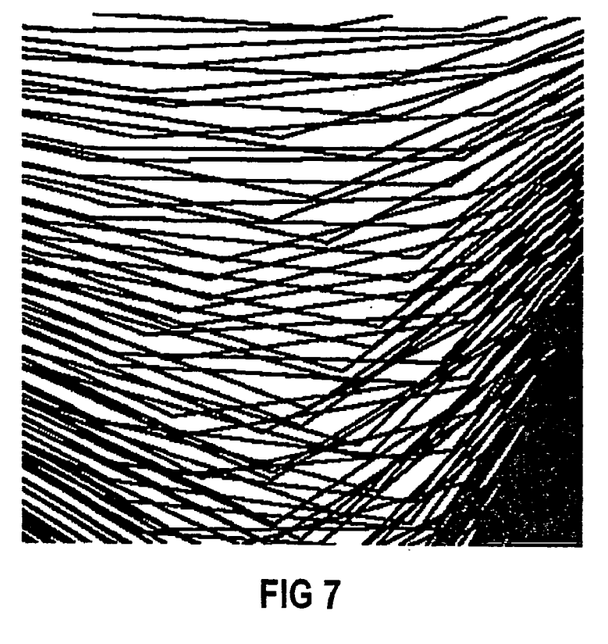
Figure 8:
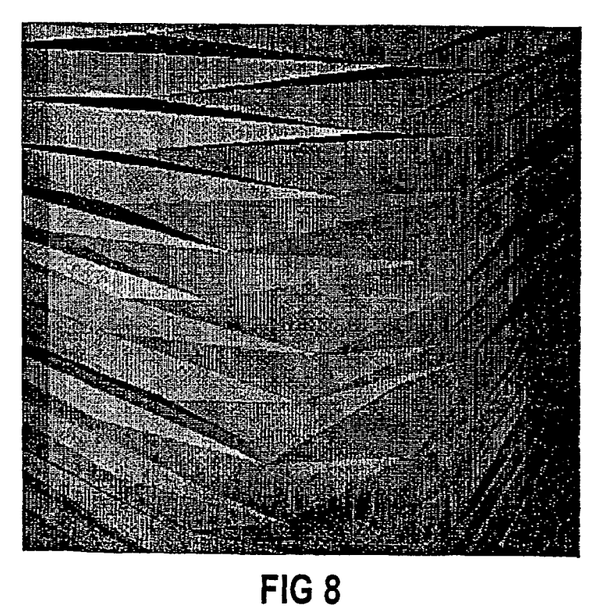

Another problem exists in the neighborhood search when calculating the penetration points through the center plane Ei. Initially, if the surface normal shows strong variations, then the same milling path can intersect the center plane Ei a second time. On the other hand, large step lengths and relatively small radii of curvature can cause a penetration point with more distal milling paths to be geometrically closer to the initial edge $\overline{PiPi+1}$ than the penetration points of the directly adjoining paths, see for example FIGS. 7 and 8. To prevent such "phase shifts", a relative feature size λ is defined. The value of the relative feature size λ defines the size of the locally smallest geometric features in terms of a ratio to the locally largest distance between adjoining milling paths. In other words: if the locally greatest distance between adjoining milling path is ρ, then radii of curvature smaller than λ×ρ are not allowed in the surrounding area. This applies both to the direction of the milling path and to the orthogonal tangential direction. A preferred value for the relative feature size λ is λ=2 which can be empirically determined and evaluated. A significantly smaller value can lead to faulty neighborhoods in milling paths with large step lengths and small radii, e.g., with jagged cube edges. A significantly larger value can cause edges along the same milling path to be connected, if very small radii of curvature in the direction of the milling path exist.

After a connection, i.e., a data point Pj on the adjacent path, has been determined for each edge $\overline{PiPi+1}$ in the aforedescribed manner, the initial connections are corrected by eliminating all connections that lead to extremely large triangles. The data point Pj is in particular an end point of an edge $\overline{PiPi+1}$ which penetrates the center plane Ei. This makes the algorithm robust against a sub-optimal selection of the relative feature size λ.

Figure 9:
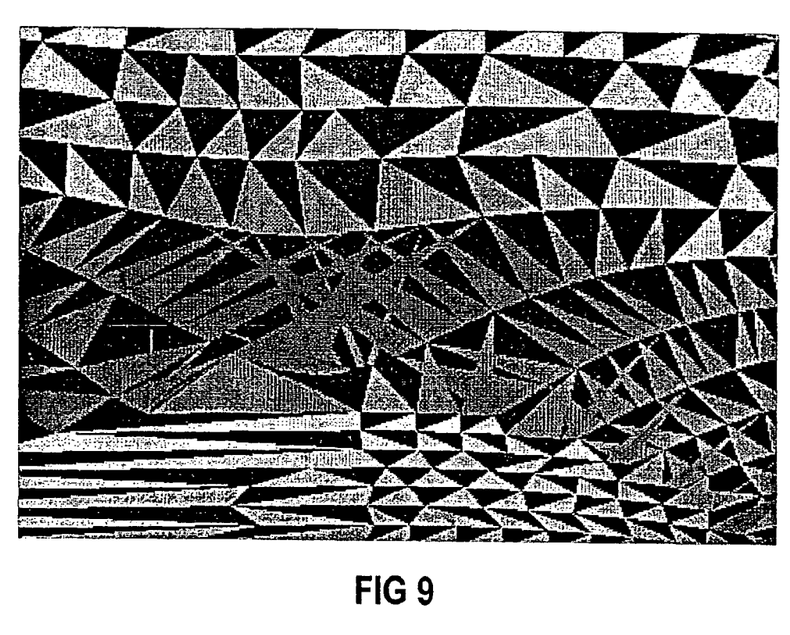
Figure 10:
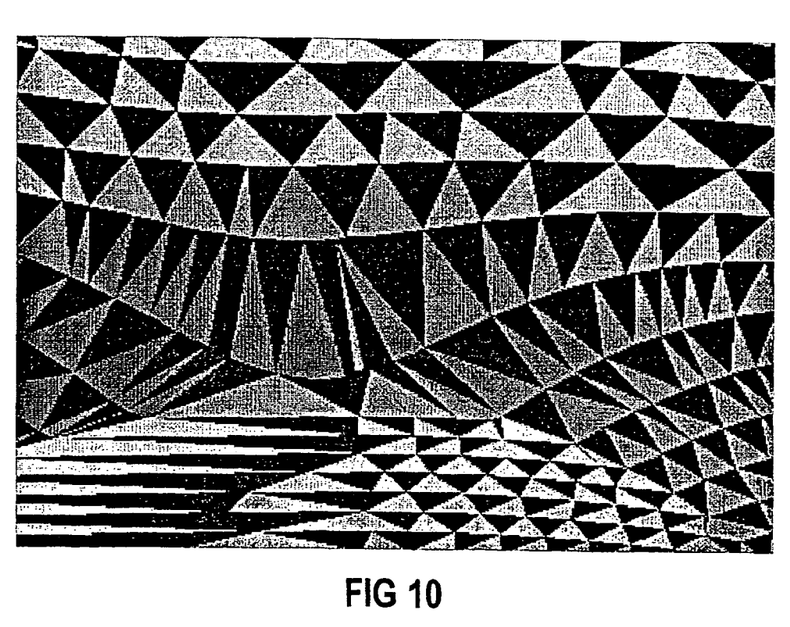

The initial connections are determined based on the penetration points of an edge with the center plane Ei. In certain situations—in particular, when the surface is very steep in the tangential direction orthogonal to the milling path—the already determined connection point can be further improved. The search result from the first step gives for each edge $\overline{PiPi+1}$ a proximate point Pj on the, for example, adjacent downstream milling path. However, this point is not necessarily the closest point Pj on this path. In a second phase, the obtained connection information is modified, so that exactly the point Pj on the adjacent path, which has the smallest Euclidian distance to the center point Mi of the edge, is associated with each edge. This improvement can potentially eliminate any faulty connections within the same milling path. For example, FIGS. 9 and 10 illustrates the achieved improvement in the initial connections by avoiding inconsistent meshing. The improved connections are obtained by a local gradient search.

Faulty connections are advantageously prevented by performing a consistency check. For this purpose, data points that are numbered either in ascending or descending order along a milling path and its adjacent paths, are checked to ascertain that the indices of connection points on consecutive milling paths also form an ascending or descending monotonous sequence. This consistency check eliminates non-monotonous index sequences in the connection points. In addition, non-monotonous index sequences at turning points of a meander-type milling edge may be viewed as being correct. If these connection points are eliminated by mistake, any resulting gaps in the surface can be closed again in a later phase, for example by fusion.

Figure 11:
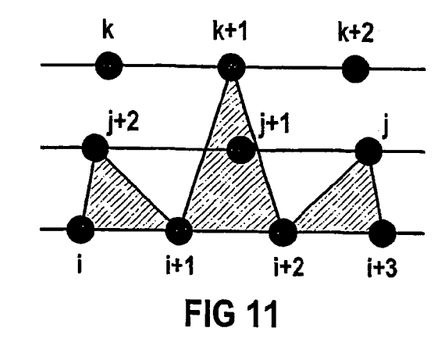
Figure 12:
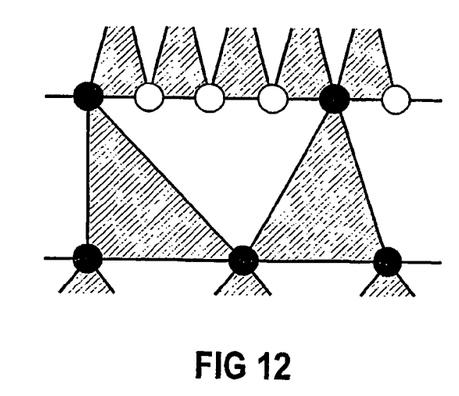
Figure 13:
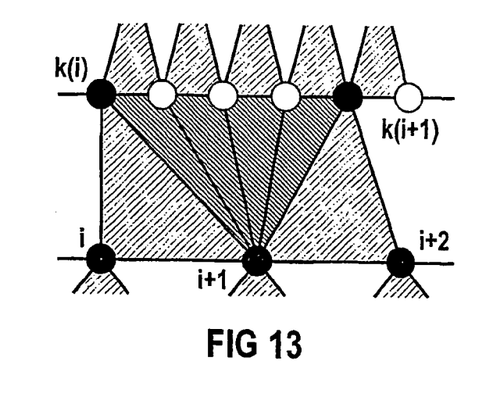

After the consistency check is concluded, either a connection point Pk(i) with k(i)>i is associated with each edge $\overline{PiPi+1}$ downstream, or a corresponding point could not be found on the adjacent milling path. FIGS. 9 and 10 show an exemplary partially reconstructed surface geometry. In addition, the corresponding upstream triangles are determined for each edge for the meshing process, preferably using the same algorithm as for downstream meshing. Preferably, for efficiency reasons, an algorithm is used which takes into consideration the topological consistency of the resulting triangular grid, as illustrated in the examples of FIGS. 11, 12 and 13. FIG. 11 shows a non-monotonous index sequences of the connection points [j+2; k+1; j] for three consecutive milling path edges $\overline{PiPi+1}$, $\overline{Pi+1Pi+2}$ and $\overline{Pi+2Pi+3}$, which is an example for inconsistent meshing. For example, the data points Pk(i) and Pk(i+1) are obtained as connection points for the directly consecutive milling path edges $\overline{PiPi+1}$ and $\overline{Pi+1Pi+2}$. This information is sufficient to determine the "forward" (upstream) connection for the entire partial sequence of the milling polygon between the data points Pk(i) and Pk(i+1). This is shown as an example in FIG. 12. FIGS. 12 and 13 represent the partial meshing reconstructed by "forward" connecting, and the complete meshing reconstructed by "reverse" connecting, during the first phases.

The essential portion of the surface geometry can be reconstructed by this type of two-stage meshing. However, undefined regions typically remain near the turning points of a meander-type or plough furrow milling path, because meaningful penetration points cannot be determined for the center plane Ei of the transition edge between adjacent milling paths. Moreover, already determined connection points could inadvertently be eliminated during the consistency check, since the monotony criterion is not satisfied. The problematic configuration with non-meshed turning loops is detected by initially identifying the existence of a reversal loop with the test $k(i)-i<\mu$ ($\mu$=global constant). If the sub-polygon Pi+1, ..., Pk(i)-1 is in fact not meshed, then a fan of additional triangles, also referred to as Triangle Fan, is generated. Gaps may still show up after the turning loops have been processed. The gaps typically appear as notches in the edge polygon of the reconstructed polyhedral surface. These notches can be easily identified by determining the interior angles of the edge polygon and eliminated by adding additional triangles. For this purpose, a corresponding threshold value is defined by introducing an additional constant.

In other words: initially, a coarse grid structure is established which includes all neighborhood associations of the individual triangle facets. All triangles that include a certain grid node can be determined from this information. In particular, these neighborhood associations can also be used to determine marginal edges and marginal nodes of the grid that has been reconstructed so far. The interior angle of a marginal node is determined as the sum of the interior angles of all adjacent triangles.

Figure 14:
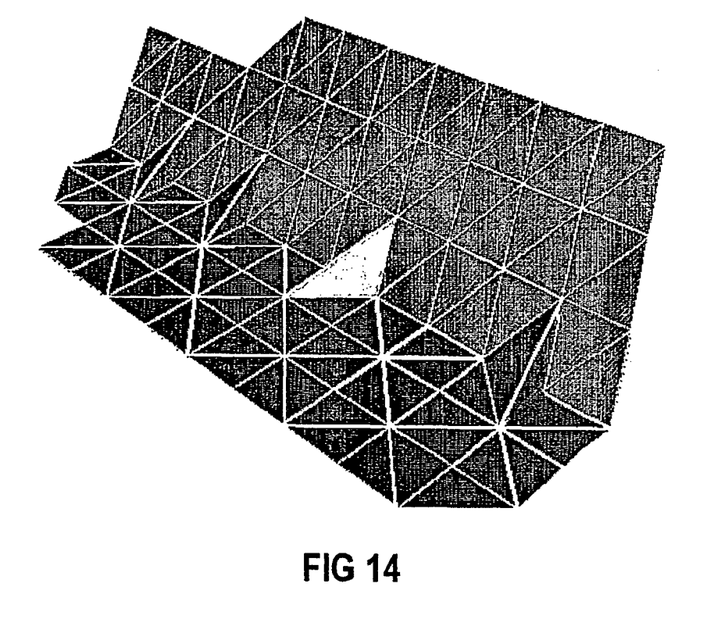
Figure 15:
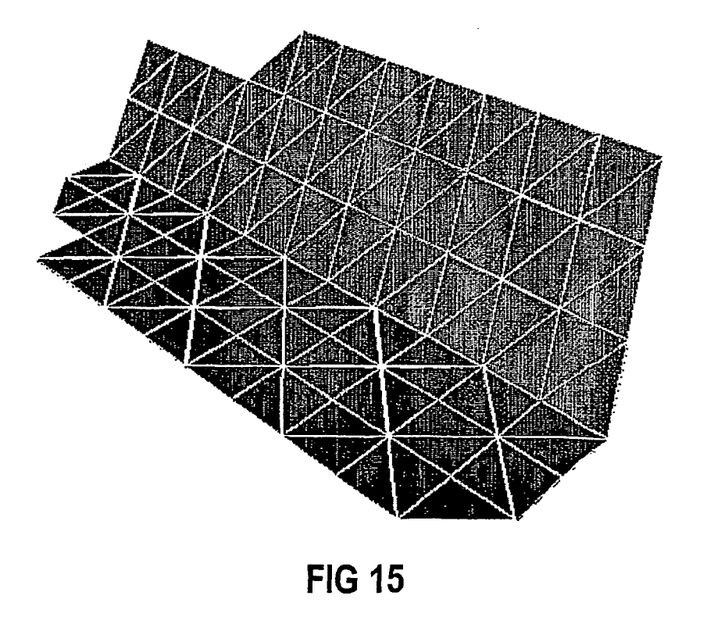

Although the completely meshed surface is topologically consistent after the first processing phases, the reconstructed piecewise linear geometry can still include geometric artifacts. These occur predominantly at actual kinks in the original geometry, as depicted in the example of FIG. 14. These artifacts can be eliminated by revising corresponding connections from the first phases, i.e. by optionally modifying the meshing between the milling paths. By such post-optimization of the meshing, geometric artifacts that occur at sharp edges of the surface to be reconstructed can be reduced. A surface that has been corrected in this way is illustrated in FIG. 15.

Each grid edge that connects two points located on adjacent milling path is hereby determined as a diagonal of a quadrilateral, which is defined by the two triangles bordering the edge. One edge is replaced by the corresponding other diagonal in this quadrilateral by a so-called "edge swap" operation. I.e., if $\Delta(A, B, C)$ and $\Delta(D, C, B)$ are two adjacent triangles, then the "edge swap" operation replaces these two triangles with $\Delta(A, B, D)$ and $\Delta(D, C, A)$. The "edge swap" operation changes the geometry of polygonal surface without affecting the grid topology. This enables a particularly simple post-optimization.

Figure 16:
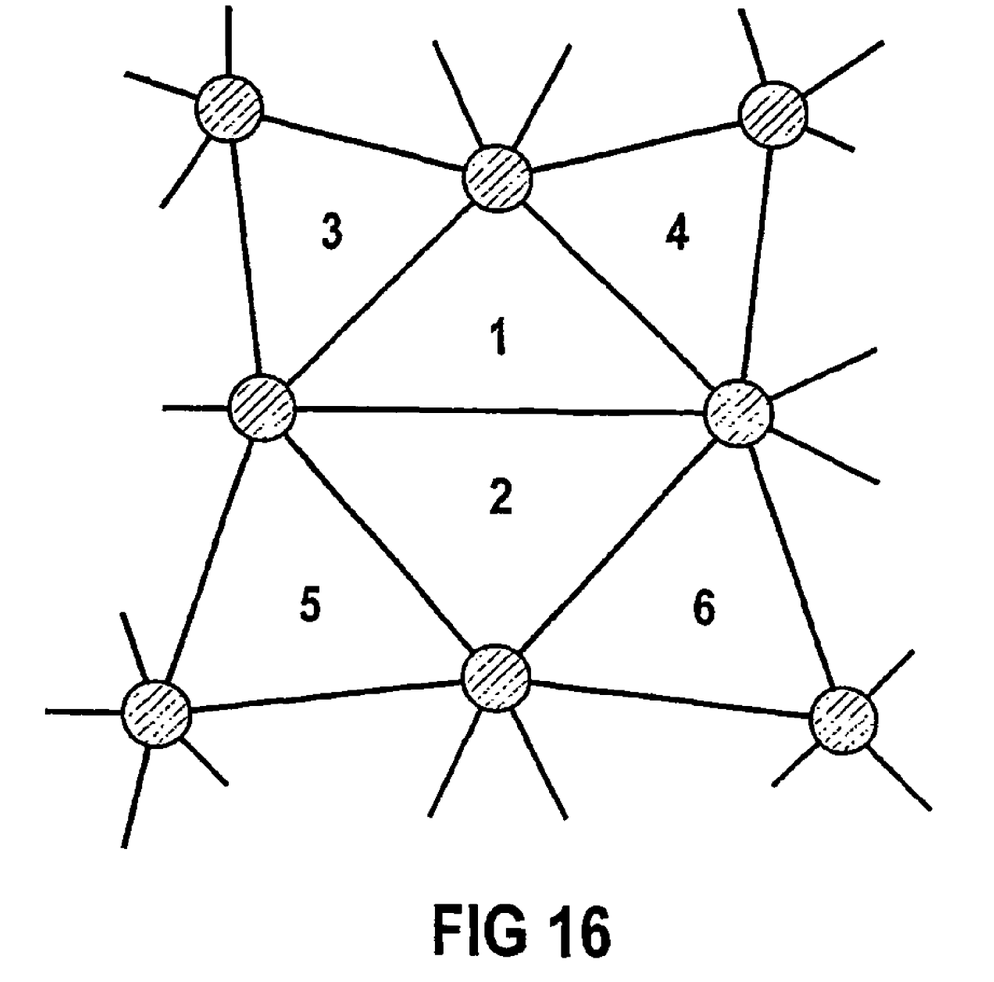
Figure 17:
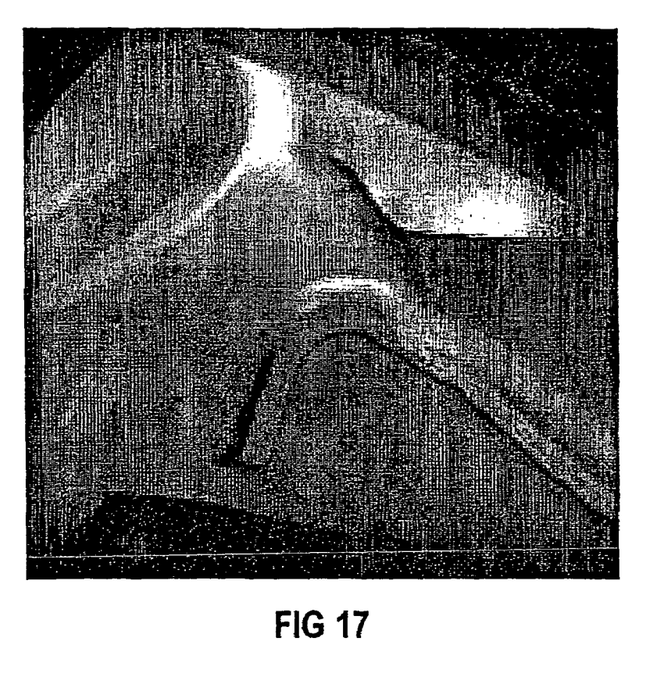
Figure 18:
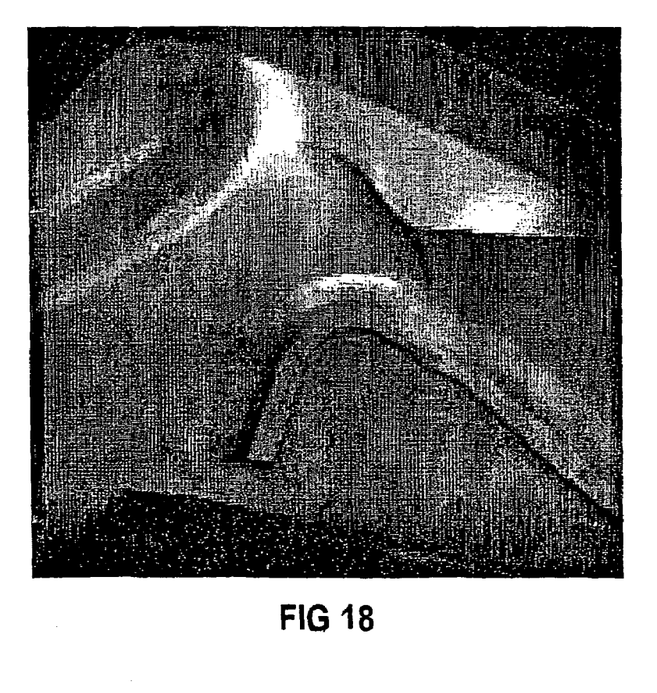
Figure 19:
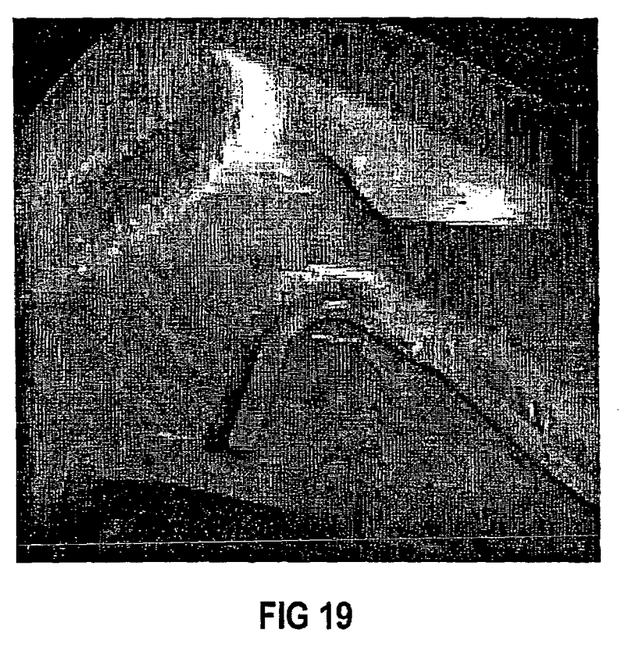
Figure 20:
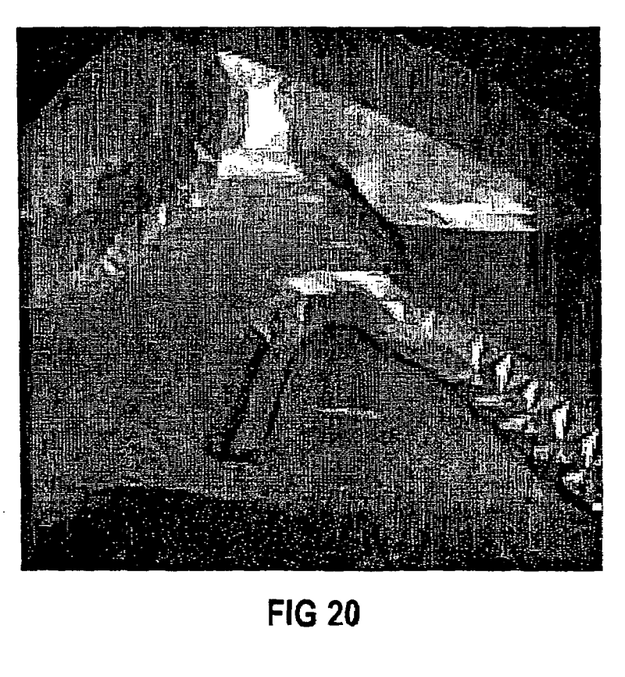

FIG. 16 shows two exemplary adjacent triangles 1 and 2 as well as the associated additional neighborhood triangles 3, 4, 5 and 6. A rigorous criterion for evaluating the quality of a polygonal surface is the maximum angle between the normal vectors of adjacent triangles. Preferably, a maximum normal angle between Ti and Tj with $(i, j) \in \{(1,3), (1,4), (2,5), (2,6)\}$ is used as a quality measure for the edge between the triangles 1 and 2. Alternatively or in addition, the resulting quality is determined after the "edge swap" operation. If the quality has improved, i.e., if the maximum normal angle has become smaller, then the "edge swap" operation is performed, otherwise the original configuration is retained. In other words: a so-called "greedy" optimization is performed, in that successively all edges are tested and, if necessary, replaced. Several passes can be performed depending on the preset optimization value.

The grid complexity with a large data sets can be reduced by coarsely approximating the original data while maintaining a predetermined approximation tolerance. Since the reduced grid data are intended primarily for visualization, a particularly simple and efficient reduction method can be used. Preferably, a so-called "vertex clustering" algorithm (=combining or grouping of grid data points) is used. The implementation of the algorithm can process arbitrary triangular grids and is not restricted to the output of the meshing algorithm.

For example, a triangular grid is defined by a set of points Pi and a set of triangles Ti=[i1, i2, i3]. The indices i1, i2, and i3 represent references for the data point list (=chronological order of existing data points, 3-D data points) and define the three corners of the triangle Ti. In the "vertex clustering" method, the points Pi are combined to three-dimensional clusters or groups, i.e., points that are close in three-dimensional space are replaced by a single representative or data point. A result, a portion of the triangles can become degenerate when at least two of the corner points are associated with the same cluster or with the same group (hereinafter referred to as cluster). These degenerate triangles are eliminated, with the remaining triangles forming the resulting less complex grid. The different "vertex clustering" techniques differ essentially in the definition of the clusters and in the selection of the representative for each cluster. The simplest cluster structure is formed from a uniform three-dimensional raster, into which the points Pi are sorted. Preferably, a raster size $\epsilon$ is defined, whereby the reduction method has an approximation tolerance of $\sqrt{3}*\epsilon$, since this is the greatest possible distance between points in the same cluster. In the computer program product, the raster size $\epsilon$ is defined as a program parameter and optionally transmitted to other NC program parts.

Several alternatives can be implemented and tested when selecting the cluster representative. One possible solution, namely to select the center point of each raster cell as a representative, leads to unacceptable results since the resulting surface shows severe oscillations in the surface normal. The surface quality can be improved by replacing the center point of the raster cell with the center of gravity of all points in the respective cluster; however, the normal vectors may still be discontinuous. A significant improvement can be obtained by using not the center of gravity of the clusters, but rather the cluster point which is closest to the center of gravity. In this way, the points in the reduced grid always form a partial set of the original points. It has to be taken account, however, that with these simple averaging strategies, the position of the representative depends on the distribution of the cluster points. I.e., with varying size of the triangles in the grid, the representative is displaced towards the greater point density, although a large number of smaller triangles may not be geometrically more significant than a small number of large triangles. This effect is preferably lessened or eliminated by using so-called error quadrics.

An error quadric is a quadratic approximation of the actual distance of an arbitrary point from the original surface and represents the approximation tolerance. A triangle Ti with a normal vector ni is defined, wherein a point x has the quadratic distance $(n^T_i x - n^T_i a_i)^2$ from the triangle Ti, wherein $a_i$ is an arbitrary edge point of the triangle Ti. In addition, an error quadric can be defined for each vertex in a triangular grid by adding the quadratic distance functions for all adjoining triangles. For example, if all adjoining triangles are located in the same plane, then the common point can be displaced within this plane without changing the surface geometry. If the point is located on an edge, i.e., if all adjoining triangles are located on two different planes, then the point can be displaced along this edge without causing a geometric error. In the general case of non-coplanar triangles, the point can not be displaced without changing the geometry, but the error quadric makes it at least possible to quantize the error depending on the displacement direction. FIGS. 17 to 20 depict different triangular grids with different approximation tolerances. A "vertex clustering" technique is used to adjust the complexity of the resulting triangular grid. The triangular grids of FIGS. 17 to 20 have approximation tolerances of 0 mm, 1 mm, 2 mm, and 4 mm, respectively.

The grid can be reduced with the error quadrics technique by adding the quadratic distances for all triangles of a cluster, thereby determining a quadric for each cluster. This quadric may still include a point that can cause a geometric error; however, at least one point can be found for which the sum of the quadratic distances is a minimum ("optimal point"). This leads to two alternative definitions for the cluster representative. On one hand, a cluster point can be selected for which the error quadric has the smallest value. On the other hand, a cluster point can be selected which has the smallest distance from the optimal point. The latter embodiment is preferred.

Figure 21:
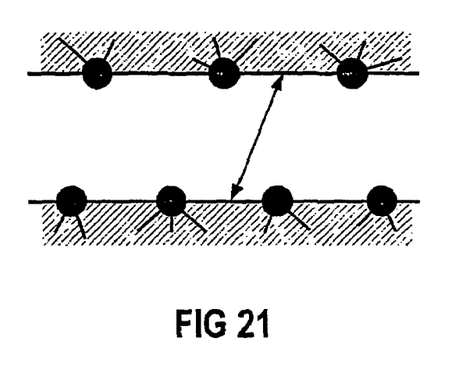
Figure 22:
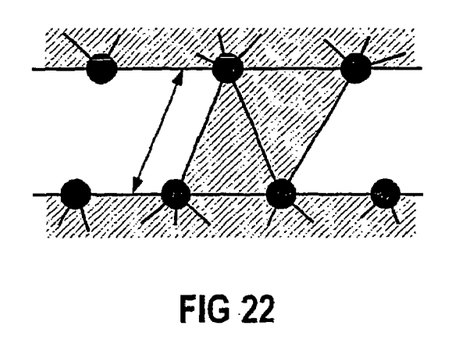
Figure 23:
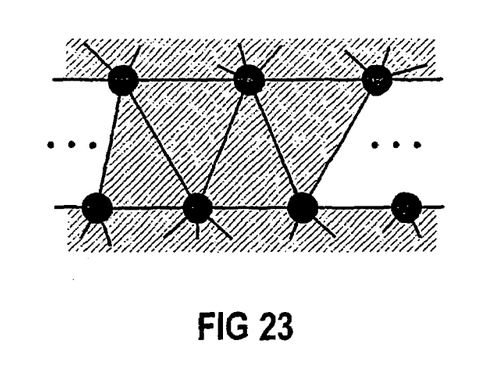

The fusion between several partial grids is performed similar to the actual meshing strategy used in meshing. The connecting algorithm is here not applied to adjacent milling paths, but to the edge polygons of the individual partial sections. As for the milling paths, it is assumed that adjacent polygons are essentially parallel, which reduces the number of special situations that have to be considered. All marginal edges are initially identified by logging the neighborhoods of the triangles when the data points are read in. These are exactly the edges associated with a single triangle. For closing the gaps between the partial grids, opposite marginal edges are determined and connected with each other. A maximum distance δ is defined (in the computer program product the maximum distance is transferred as an argument) when searching for opposing edges. With this limitation, the marginal edges of the reconstructed surface are not connected with each other, but remain open. The connection point to be associated with the marginal edge is determined essentially in the same manner as with the actual meshing algorithm by determining the closest penetration point. It has to be taken into consideration that the simplified backward connection can no longer be used, since assumptions about indexing the marginal polygons can no longer be made. For this reason, individual connection points are determined and the edges are connected directly which each other, generating two triangles for each association step. New edges formed in this meshing step are themselves again treated as marginal edges. FIGS. 21 to 23 illustrate gaps that are closed between adjacent partial grids by connecting "opposite" edges with each other.

In the following, the computer program product will be described with reference to command line arguments and their use in various NC programs. Since the respective algorithms operate automatically, no user interaction is required.

The exemplary program "mesh.c" reads a point file via a standard input device, executes meshing and writes the result as an ASCII file to a standard output device according to:

$$\text{mesh} < \text{IN\_PTS} > \text{OUT\_TRI} \quad (1)$$

The parameters and constants for the algorithm are set to empirically determined default values, but can also be changed in the header of the source code file. The flexibility of the program can be enhanced by adding or removing the different phases of the algorithm separately through the corresponding #defines, if certain optimizations for special data sets are not desired, according to:

```
define REMOVE_ABOVE_MEDIAN/**/ define ADJUST_TO_CLOSEST/**/ define DELETE_NON_MONOTONIC/**/

/*#define REMOVE_LONGER-
    _THAN_MAX_EDGE/**/ define CONNECT_BACKWARDS/**/ define PROCESS_U_LOOPS/**/ define FILL_GAPS/**/ define SWAP_EDGES/**/                          (2)
```

Another program referred to as "raster.c" implements the vertex clustering algorithm. Various variations of the algorithm can be set with #defines according to:

```
/*#define FIND_SVD_POINT/**/

/*#define FIND_MINIMAL_QUADRIC_ERROR/**/ define FIND_CLOSEST_TO_CENTER_OF-
    _GRAVITY/**/ define BAD_RASTER_DEBUG/**/                    (3)
```

In a basic version, the raster representative is determined by averaging. The resulting grids show corresponding staircase artifacts. A somewhat refined method is defined by:

```
/*#define FIND_SVD_POINT/**/ define FIND_MINIMAL_QUADRIC_ERROR/**/

/*#define FIND_CLOSEST_TO_CENTER_OF-
    _GRAVITY/**/
```

```
/*#define BAD_RASTER_DEBUG/**/                    (4)
```

This is a much better approximation of the original surface. Finally, the variation

```
#define FIND_SVD_POINT/**/

/*#define FIND_MINIMAL_QUADRIC_ERROR/**/

/*#define FIND_CLOSEST_TO_CENTER_OF-
    _GRAVITY/**/

/*#define BAD_RASTER_DEBUG/**/                    (5)
``` delivers the best results. The program is called by:

```
raster IN_PTS IN_TRI EPS OUT_PTS OUT_TRI          (6)
```

Herein, raster.exe is a name of the compiled program, IN_PTS is the name of a point file, and IN_TRI is the name of a file with the triangle indices (as generated by MESH.EXE). EPS is a floating point value which indicates a maximum allowable approximation tolerance. The output is stored accordingly in the files OUT_PTS and OUT_TRI.

A program referred to as "join.c" is executed as follows:

```
join IN_PTS IN_TRI EPSILON OUT_PTS OUT-
    _TRI                                          (7)
```

Herein, IN_PTS is a list of points, IN_TRI a list of triangles, and EPSILON is a floating point number which indicates the maximum size of a gap to be closed. The value EPSILON is necessary for connecting edges with each other that are not located opposite of each other. The width of the expected gaps is determined beforehand. The output is a new list of triangles which includes the old as well as the newly generated triangles. If several separately meshed grids are to be connected, then these have to be converted first to a common grid with several affiliation components, with the JOIN program thereafter closing the gaps. Two point lists P1 with n1 data points and P2 with n2 data points are defined. T1 is a list of triangles relating to P1, and T2 is a list of triangles relating to P2. (P1, T1) and (P2, T2) hence form two separate grids. The two point lists are readily combined via: P=[P1; P2]. When the two lists of triangles are combined, the indices in T2 have to be modified, i.e., T=[T1; T2+n1], whereby n1 is the length of the point list P1.

In summary, for a particularly simple and fast multi-dimensional surface reproduction according to the invention, a method for reconstructing a surface having a structure represented by 3-D data points arranged in chronological order is described, wherein the 3-D data points are processed based on a linear interpolation in such a way that chronologically directly adjacent 3-D data points remain unchanged.

What is claimed is:

1. A method for approximately reconstructing a surface of a workpiece to be milled having a structure described by 3-D data points arranged in chronological order of a milling path, comprising:
   linearly interpolating the chronologically arranged 3-D data points to generate interpolated data point,
   while leaving those directly adjacent chronologically arranged 3-D data points unchanged, and
   reconstructing the surface using the interpolated data points and the chronologically arranged 3-D data points.

2. The method according to claim 1, and further comprising the steps of presetting an approximation tolerance, and combining a subset of the chronologically arranged 3-D data points which are spaced by less than a predetermined step length to a grid data point by taking into account the approximation tolerance.

3. The method according to claim 2, end further comprising the steps of subdividing the grid into a plurality of sub-grids which include edge paints or edge polygons, and connecting the plurality of sub-grids with each other based on the grid data points in such a way that the edge points or edge polygons remain unchanged when the sub-grids are connected.

4. The method according to claim 1, and further comprising the steps of connecting selected ones of the chronologically arranged 3-D data points with each other, and performing a meshing operation to eliminate gaps between adjacent milling paths.

5. The method according to claim 4, wherein the milling paths are in the shape of polygons, and wherein performing the meshing operation to eliminate gaps includes the step of associating at least two triangles with an edge of a polygonal milling path.

6. The method according to claim 5, wherein the at least two triangles are associated with the edge of the polygonal milling path in such a way that each triangle connects the polygonal milling path with an adjacent polygonal milling path in a one-to-one correspondence.

7. A system for approximately reconstructing a surface of a workpiece to be milled having a structure described by 3-D data points arranged in chronological order of a path to be milled comprising:
   an input device receiving the chronologically arranged 3-D data points,
   an interpolator that linearly interpolates the 3-D chronologically arranged data points to generate interpolated data points, while leaving the chronologically arranged 3-D data points unchanged, and
   an output device that outputs the interpolated data points and the chronologically arranged 3-D data points for further processing or visualization.

8. A computer program, residing on a computer readable medium, for reconstructing a surface of a workpiece to be milled having a structure described by chronologically arranged 3-D data points defining a milling path, said computer program comprising instructions for causing a computer to read the chronologically arranged 3-D data points, linearly interpolate the chronologically arranged 3-D data points to generate interpolated data points, while leaving the directly adjacent chronologically arranged 3-D data points unchanged, and reconstruct the surface using the interpolated data points and the chronologically arranged 3-D data points.

* * * * *

UNITED STATES PATENT AND TRADEMARK OFFICE
CERTIFICATE OF CORRECTION

| | | |
|---|---|---|
| PATENT NO. | : 7,062,353 B2 | Page 1 of 1 |
| APPLICATION NO. | : 10/416746 | |
| DATED | : June 13, 2006 | |
| INVENTOR(S) | : Wolfgang Papiernik | |

It is certified that error appears in the above-identified patent and that said Letters Patent is hereby corrected as shown below:

Cover Page (75), Line 3 change "Aachan" to --Aachen--

Cover Page (87), change "WO02/39080" to --WO02/39380--

Column 11, line 57: change "point" to --points--

Signed and Sealed this

Fifth Day of December, 2006

JON W. DUDAS
*Director of the United States Patent and Trademark Office*